United States Patent
Fei (10) Patent No.: US 10,042,646 B2
(45) Date of Patent: Aug. 7, 2018

(54) SYSTEM AND METHOD OF MERGING PARTIAL WRITE RESULT DURING RETIRE PHASE

(71) Applicant: VIA ALLIANCE SEMICONDUCTOR CO., LTD., Shanghai (CN)

(72) Inventor: Xiaolong Fei, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 186 days.

(21) Appl. No.: 15/246,922

(22) Filed: Aug. 25, 2016

(65) Prior Publication Data

US 2017/0371667 A1 Dec. 28, 2017

(30) Foreign Application Priority Data

Jun. 22, 2016 (CN) .......................... 2016 1 0455541

(51) Int. Cl.
*G06F 9/38* (2018.01)
*G06F 9/30* (2018.01)

(52) U.S. Cl.
CPC .......... *G06F 9/384* (2013.01); *G06F 9/30145* (2013.01); *G06F 9/3857* (2013.01)

(58) Field of Classification Search
CPC .............................. G06F 9/384; G06F 9/3857
See application file for complete search history.

(56) References Cited

U.S. PATENT DOCUMENTS

| 5,446,912 | A | | 8/1995 | Colwell et al. |
| 5,802,339 | A | | 9/1998 | Sowadsky et al. |
| 6,094,719 | A | * | 7/2000 | Panwar ............... G06F 9/30014 708/513 |
| 6,493,819 | B1 | * | 12/2002 | Mahurin ............. G06F 9/30014 712/210 |
| 7,840,783 | B1 | * | 11/2010 | Singh .................. G06F 9/30112 712/217 |
| 2002/0083307 | A1 | | 6/2002 | Sager et al. |
| 2002/0129224 | A1 | * | 9/2002 | Leber .................. G06F 9/30032 712/209 |

(Continued)

FOREIGN PATENT DOCUMENTS

CN 104049947 A 9/2014

*Primary Examiner* — Jacob A Petranek
(74) *Attorney, Agent, or Firm* — McClure, Qualey & Rodack, LLP (57) ABSTRACT

A processor including a physical register file, a rename table, mapping logic, size tracking logic, and merge logic. The rename table maps an architectural register with a larger index and a smaller index. The mapping logic detects a partial write instruction that specifies an architectural register that is already identified by an entry of the rename table mapped to a second physical register allocated for a larger write operation, and includes an index for the allocated register for the partial write instruction into the smaller index location of the entry. The size tracking logic provides a merge indication for the partial write instruction if the write size of the previous write instruction is larger. The merge logic merges the result of the partial write instruction with the second physical register during retirement of the partial write instruction.

20 Claims, 4 Drawing Sheets

| | ARCH | SPECULATIVE | | | | RETIRE |
|---|---|---|---|---|---|---|
| | | LARGER | SMALLER | LAST WRITE SIZE | LARGER WRITE SIZE | |
| 202 → | EBX | - | - | - | - | PRA |
| 204 → | ECX | - | - | - | - | PRB |
| 206 → | EAX | PRC | PRD | SZ1 -> SZ2 | - | PRC |
| 208 → | ESP | PRE | - | SZ3 | - | PRE |
| | . | . | . | . | . | . |
| | . | . | . | . | . | . |

↘ 116

(56) References Cited

U.S. PATENT DOCUMENTS

| | | | | |
|---|---|---|---|---|
| 2010/0274961 A1* | 10/2010 | Golla | ............... | G06F 9/384 |
| | | | | 711/108 |
| 2010/0274992 A1* | 10/2010 | Chou | ............ | G06F 9/30032 |
| | | | | 712/216 |
| 2015/0121047 A1* | 4/2015 | Bradbury | ......... | G06F 9/30098 |
| | | | | 712/226 |

* cited by examiner

SYSTEM AND METHOD OF MERGING PARTIAL WRITE RESULT DURING RETIRE PHASE

BACKGROUND OF THE INVENTION

Field of the Invention

The present invention relates in general to physical register renaming to resolve stored result size issues in a processor, and more particularly to merging a subsequent partial write result with a previous larger write result in the retire phase.

Description of the Related Art

A processor incorporates a set of registers to store the results of write operations. Write operations are performed by a subset of the standard instruction set architecture (ISA) of the processor, such as the x86 architecture or the like by Intel®. In many architectures, including x86, instructions that perform a write operation may refer to at least one of a set of predefined architectural registers for storing the results. More recent processor configurations implement a physical register file (PRF) renaming style that makes the processor design more concise and enables more convenient design expansion. A processor with PRF renaming incorporates a physical register file (PRF) for storing operation results and a renaming structure for mapping architectural registers to physical registers. The PRF is a set of physical registers, each being identified using a unique one of a set of indexes or pointers or the like. The renaming structure maps an architectural register referenced by an instruction to an index of a corresponding physical register.

During execution of a software program or application, when an instruction is encountered that references an architectural register for storing the results of the instruction, the processor allocates an available physical register from among a "freelist" of physical register indexes, attaches or otherwise assigns the selected index to the instruction, and updates a speculative portion of the renaming structure to map the architectural register to the selected physical register. When the instruction is executed, the index is used to access the physical register to store the results. When the instruction is retired, the index may be moved to a retire portion of the renaming structure (or else to a different renaming structure) to map the physical register to the specified architectural register. The physical to architectural register mapping may be used by subsequent read operations until overwritten or redefined. A separate set of physical architectural registers are not needed; instead, architectural identifiers or the like are simply mapped to the physical registers. The PRF renaming style is more efficient since the indexes are simply moved or remapped rather than having to move values between registers.

A sizing issue arises when the architecture uses complex operand sizes which allows partial write operations to modify only a portion of the entire register. The x86 architecture, for example, uses such complex operand sizes although the present invention is not limited to the x86 architecture. As an example of complex operand sizes, write instructions may be executed to modify 8 bits, 16 bits, 32 bits or 64 bits of a 64-bit register, in which each larger size incorporates the smaller write sizes (since referenced from a common end of the register). Each instruction is assigned a separate physical register even if referencing the same architectural register. A subsequent write operation that is the same size or larger than a prior write operation to the same architectural register is properly handled in the system without further modification. A subsequent write operation that is smaller than a prior write operation to the same architectural register, however, causes a problem for a following read operation referencing the same architectural register since it does not hold the complete result if the source of the read operation referencing the same architectural register is larger than the subsequent write operation.

Multiple source dependency may solve this issue, but at least requires double read ports for the PRF. Another possible solution is to merge the values stored in the physical registers before the read instruction, but this requires that all of the sources of the issued instructions be detected in the same cycle which may decrease issue bandwidth for complex cases. This preliminary merge solution may cause additional inefficiencies and may impose critical timing issues.

SUMMARY OF THE INVENTION

A processor according to one embodiment includes a physical register file, a rename table, mapping logic, size tracking logic, and merge logic. The physical register file includes multiple physical registers, each identified by a corresponding physical register index. The rename table includes multiple entries, each storing an architectural identifier identifying one of multiple architectural registers, a larger physical register index and a smaller physical register index. The mapping logic detects a partial write instruction specifying an architectural register already identified by an existing entry within the rename table for a previous write instruction having a write size that is larger than the partial write instruction. If so, the mapping logic allocates a first physical register and updates the smaller physical register index of the existing entry with a first physical register index of the first physical register. The size tracking logic that sets a merge indication for the partial write instruction if the write size of the previous write instruction is larger than the partial write instruction. The merge logic merges a result of the partial write instruction with a second physical register during the retirement of the partial write instruction in response to the merge indication. The second physical register is identified by the larger physical register index of the existing entry.

The size tracking logic may access a last write size location of the existing entry to determine whether a read instruction specifies a source as the same architectural register mapped to both the previous and partial write instructions, in which the last write size stores a write size of a last write instruction and in which the last write instruction is a later one of the previous write instruction and the partial write instruction. If a size of the source of the read instruction is larger than the write size of the last write instruction, then the size tracking logic determines whether the read instruction specifies the source as the same architectural register mapped to both the previous and partial write instructions.

The size tracking logic may determine that a read instruction specifies a source as the same architectural register mapped to both the previous and partial write instructions, and if so, marks the read instruction as self-serializing and sets the read instruction as dependent upon the previous write instruction.

The processor may further include renaming switch logic that transitions the first physical register to a retired non-architectural state upon retirement of the partial write instruction and that transitions the second physical register to a retired architectural state upon retirement of the previous write instruction. The renaming switch logic may further recycle the first and second physical registers when a subsequent instruction remaps the same architectural register identified in the existing entry of the rename table.

The processor may further include a partial write buffer that stores the result of the partial write instruction during write back. In this case, the merge logic instead reads the result of the partial write instruction from the partial write buffer.

The write size of the previous write instruction may be stored in a larger write size location of the existing entry. In this case, the mapping logic may access the larger write size location to determine whether to update the smaller physical register index of the existing entry. Also, the size tracking logic may access the larger write size location to determine whether to provide the merge indication. The merge indication may be stored as a merge bit in an entry of a reorder buffer for the partial write instruction.

A method of merging partial write results to resolve size issues in a processor, including allocating a first physical register from a register file for a first write instruction and mapping the first physical register to an architectural register, allocating a second physical register from the register file for a second write instruction that references the architectural register, comparing a write size of the second write instruction with a write size of the first write instruction, mapping the second physical register to the architectural register according to a result of comparing the sizes of the first and second write instructions, providing a merge indication for the second write instruction if the write size of the second write instruction is smaller than a write size of the first write instruction, and upon retirement of the second write instruction, merging a result of the second write instruction into the first physical register in response to the merge indication.

The method may include storing a first index in a larger location of an entry of a rename table for the architectural register. The method may include storing a second index in a smaller location of the entry if the write size of the second write instruction is smaller than the write size of the first write instruction, and storing the second index in the larger location of the entry if the write size of the second write instruction is not smaller than the write size of the first write instruction. The method may include reading a size value of the second write instruction stored in an entry of a rename table mapped to the second write instruction. The method may include marking a subsequent read instruction as self-serializing and making the read instruction dependent upon the first write instruction when the read instruction specifies the same architectural register mapped to both the first write instruction and the second write instruction as a source.

The method may further include transitioning the first physical register to a retired non-architectural state upon retirement of the second write instruction, and transitioning the second physical register to a retired architectural state upon retirement of the first write instruction. The method may include recycling the first and second physical registers when a subsequent instruction remaps the architectural register in the rename table.

The method may further include storing the result of the second write instruction into a partial write buffer during write back of the second write instruction if the write size of the second write instruction is smaller than the write size of the first write instruction, and reading the result of the second write instruction from the partial write buffer during the merging operation. The method may include storing the write size of the first write instruction, and comparing the write size of the second write instruction with the stored write size of the first write instruction. The method may include storing the merge indication as a merge bit in an entry of a reorder buffer for the second write instruction.

BRIEF DESCRIPTION OF THE DRAWINGS

The benefits, features, and advantages of the present invention will become better understood with regard to the following description, and accompanying drawings where.

DETAILED DESCRIPTION

The inventor has recognized sizing issues of the PRF renaming style caused by an instruction set architecture that use complex operand sizes. He has therefore developed a system and method of storing partial write results and merging the results in the retire phase. Each architectural entry in a rename table includes a larger write index location and a smaller write index location. In some embodiments, each architectural entry further includes a larger write size location and a last write size location. Mapping logic allocates a physical register for each write instruction and updates the rename table accordingly. Size tracking logic monitors the rename table and provides a merge indication for a partial write instruction that writes a smaller portion to the same architectural register as a previous larger write instruction. In some embodiments, a partial write buffer is provided to temporarily store the results of partial write instructions that modify only a portion of the full register size. When the second and smaller-sized write instruction retires, merge logic in the retire phase merges the results of the second and smaller-sized write instruction with the physical register of the larger write operation if the merge indication is provided with the second write instruction. A subsequent instruction that reads the architectural register marks itself as self-serializing (SS), meaning that it is marked to be the oldest to dispatch for execution, and sets its dependency upon the larger write operation if the read instruction specifies a source as an architectural register mapped to both the smaller write instruction and the larger write instruction.

In a more specific configuration, the mapping logic stores an index of an allocated physical register for a first write instruction into the larger write index location of a specified architectural entry. When the mapping logic detects a second, subsequent and smaller-sized write instruction to the same architectural register, it stores an index of another allocated physical register for a second write instruction into the smaller write index location of the specified architectural entry. In a more specific configuration, the mapping logic further stores the corresponding size of the first write instruction into the larger write size location of the specified architectural entry. In this manner, the size tracking logic detects a sizing issue by comparing the size of the second write instruction with the size of the first write instruction stored in the larger write size location, and then provides the merge indication if the size of the second write instruction is smaller than the size of the first write instruction so that the partial write results are merged with the architectural register upon retirement of the second write instruction. In a more specific configuration, the mapping logic further stores the corresponding size of a last write instruction into the last write size location of the specified architectural entry, and the last write instruction is a later one of the first write instruction and the second write instruction.

Figure 1:
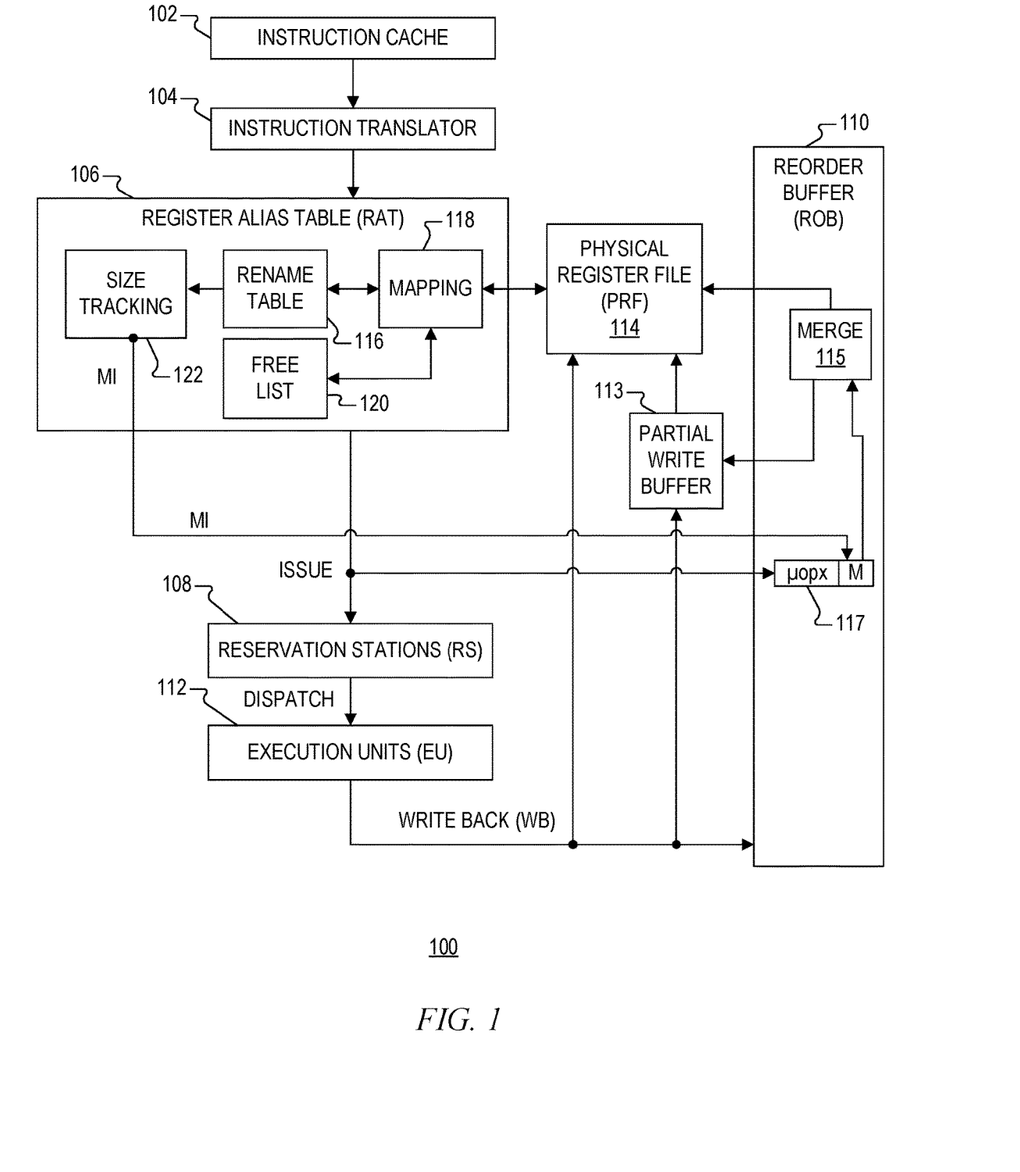
FIG. 1 is a simplified block diagram of a superscalar, pipelined processor implemented according to one embodiment of the present invention.

FIG. 1 is a simplified block diagram of a superscalar, pipelined processor 100 implemented according to one embodiment of the present invention. The term "processor" as used herein refers to any type of processing unit, including a microprocessor, a central processing unit (CPU), a processing core, a microcontroller, etc. The term "processor" as used herein also includes any type of processor configuration, such as processing units integrated on a chip or integrated circuit (IC) including those incorporated within a system on a chip (SOC) or the like.

The processor 100 includes an instruction cache 102 that caches macroinstructions of an instruction set architecture (ISA), such as the x86 instruction set architecture or the like. Additional or alternative instruction set architectures are contemplated. The processor 100 includes an instruction translator 104 that receives and translates the macroinstructions into microinstructions. The microinstructions are then provided to a register alias table (RAT) 106, which generates microinstruction dependencies and issues the microinstructions in program order to reservations station (RS) 108 and to a reorder buffer (ROB) 110, which stores an entry for every instruction issued from the RAT 106 and which ensures in-order retirement of instructions. An exemplary entry 117 is shown for a microinstruction, shown as "µopx." The microinstructions issued from the RAT 106 may typically be referred to as microinstructions, but are more generally referred to herein simply as "instructions."

The RS 108, otherwise referred to as a dispatcher, dispatches the instructions to an appropriate one of multiple execution units 112. Although not specifically shown, the execution units 112 may include one or more integer execution units, such as an integer arithmetic/logic unit (ALU) or the like, one or more floating point execution units, such as including a single-instruction-multiple-data (SIMD) execution unit such as MMX and SSE units or the like, a memory order buffer (MOB), etc. Any result of a write instruction is written to a physical register within a physical register file (PRF) 114 via a write back (WB) path. The entry of the ROB 110 corresponding to the write instruction stores an index to the physical register for writing the results. In some embodiments, the ROB 110 entry of each partial write instruction further stores a merge (M) bit, which is set by the RAT 106 when a partial write instruction passes through the RAT 106 and the merge indication MI is asserted. In one embodiment, a partial write buffer 113 is further included for temporarily storing partial write results during write back in order to release the pressure of requiring read ports for the PRF 114 when doing merge during retirement of the partial write instruction. In other embodiments, the partial write buffer 113 could be omitted, and the partial write results are only stored in the PRF 114 if the read ports of the PRF 114 are sufficient. In one embodiment, the results of each partial write instruction are stored in the partial write buffer 113 even when a merge may not be indicated. As further described herein, the ROB 110 includes merge logic 115 that, in response to the merge bit being set, merges the partial write results into a physical register within the PRF 114.

The RAT 106 includes a rename table 116, mapping logic 118, a free list 120, and size tracking logic 122. The rename table 116 cross-references or maps architectural registers to the physical registers of the PRF 114. The free list 120 stores a list of indexes to corresponding physical registers that are not allocated. When a write operation references an architectural register for storing results, the mapping logic 118 consults the free list 120 and selects and allocates a physical register. The mapping logic 118 then stores the index of the allocated physical register into an entry of the rename table 116 corresponding to the architectural register referenced in the write instruction. In this manner, the physical register is initially mapped to both the architectural register and the write instruction. As further described herein, each entry of the rename table 116 includes locations for storing physical register indexes for smaller and larger writes to the same architectural register. The size tracking logic 122 detects a merge condition in which partial write results stored in a first physical register (and/or the partial write buffer 113, if provided) are to be merged with a second physical register that is mapped to the same architectural register as the first physical register. When the merge condition is detected, the size tracking logic 122 asserts the MI signal for the partial write instruction and the RAT 106 sets the M bit of the corresponding entry in the ROB 110. It is noted that the M bit may be set beforehand in the instruction information being pushed into the ROB 110 entry, or may be set directly within the entry of the ROB 110. In one embodiment, the merge condition is met when comparing the write size of the partial write instruction with the write size of the previous and larger write instruction, and the comparing result of the former is smaller.

Figure 2:
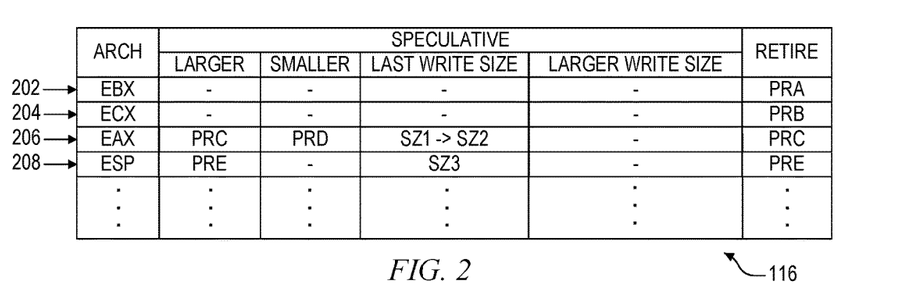
FIG. 2 is a diagram of the rename table of FIG. 1 according to one embodiment of the present invention.

FIG. 2 is a diagram of the rename table 116 according to one embodiment of the present invention. The ISA for the processor 100, such as x86 in the illustrated configuration, uses complex operand sizes allowing partial writes to each architectural register. The x86 architecture includes several architectural registers that may be accessed with multiple sizes. The 64-bit versions include register notations RAX, RBX, RCX, RDX, etc., (64-bit uses pre-pended 'R' notations) in which a write operation using any of these 64-bit notations is a write to the entire register. These registers include 32-bit notations EAX, EBX, ECX, EDX, etc., respectively, (32-bit uses pre-pended 'E' notations) as well as 16-bit notations AX, BX, CX, DX, etc., respectively (16-bit uses only register name without a pre-pended letter). 8-bit notations may also be defined, but each is typically to the most significant byte (MSB) or the least significant byte (LSB) of the 16-bit version and are not further described. The architectural identifiers in the rename table 116 need only include a single reference for any given register or portions thereof.

Prior to discussing the novel configuration of the rename table 116, a conventional configuration is first described. In a conventional configuration, the speculative portion of each table entry only includes a single location for storing the index of the allocated physical register, and the architectural identifiers may identify each register including partial register notations. In operation of the conventional configuration, the mapping logic 118 detects a write instruction that references an architectural register, selects and allocates a physical register for storing the results of the write operation, and consults the rename table 116 to determine whether an entry already exists for the architectural register. If the entry does not already exist, then the mapping logic 118 allocates a new entry in the rename table 116 and writes an architectural register identifier into the ARCH location of the new entry. The mapping logic 118 then writes the index of the allocated physical register into the speculative portion of the new or updated entry. The RETIRE location is not yet determined. Assuming that the write instruction retires with the same architectural and physical register mapping, the mapping logic 118 changes the architecture mapping by moving or otherwise copying the index of the physical register from the speculative location to the retire location for that architectural register. It is noted that various configurations may include different speculative and retired rename tables, but operation is substantially similar.

The conventional configuration presents a challenge when a series of instructions employ complex operand sizes in which multiple physical registers store portions of the same architectural register. As an example, consider the following instruction pattern:

μop1) MOV EAX, EBX
μop2) MOV AX, CX
μop3) MOV ESP, EAX in which each instruction is illustrated as a microinstruction or micro-op (μop). A first physical register is allocated for the first MOV instruction (μop1) and the allocated physical register is mapped to the EAX architectural register. The first MOV instruction μop1 instructs the processor 100 to move the contents of the 32-bit register EBX into the 32-bit register EAX. In operation, the content of a physical register allocated to EBX is moved to the physical register allocated for EAX. A second physical register is allocated for the second MOV instruction (μop2) and mapped to the AX architectural register. The second MOV instruction μop2 instructs the processor 100 to move the contents of the 16-bit register CX into the 16-bit register AX. In operation, the content is moved from one physical register to another according to the mapping. It is noted, however, that architectural register AX is the least significant portion (lower half) of the EAX architectural register, so that effectively the contents of the EAX register are intended to be modified by μop2. Thus, neither of the first and second physical registers holds the complete contents of the EAX architectural register; instead, a portion is stored in each. A third physical register is allocated for the third MOV instruction (μop3) and mapped to the ESP architectural register (e.g., stack pointer register). The third MOV instruction is intended to move the contents of EAX into ESP. The contents of EAX, however, are distributed between two different physical registers, so that μop3 cannot fetch the complete contents of EAX from a single physical register. Various methods have been used to resolve this condition, such as multiple source dependency and pre-merge operations, but these approaches have significant drawbacks.

A system and method of merging a partial write result during the retire phase as described herein resolves the condition of stored result size issues without introducing the same drawbacks. Operation is modified for the rename table 116 and other portions of the processor 100 as further described herein. Each row of the rename table 116 forms an entry that corresponds to a referenced architectural register, and each entry includes multiple storage locations for storing corresponding values for that entry. For each entry, the first column (on left) includes a location for storing an architectural register (ARCH) identifier of the entry, the next three columns includes locations for storing speculative operation values for the entry, and the last column provides a location for storing a physical register index for the RETIRE phase of operation for the entry. These speculative operation values include a LARGER location for storing a physical register index for a larger write instruction and a SMALLER location for storing a physical register index for a smaller write instruction. In some embodiments, these speculative operation values further include a LAST WRITE SIZE location for storing a size value indicating the last write size for the entry.

As shown, a first entry 202 maps a physical register identified by index PRA (or simply referred to as physical register PRA) to the architectural register EBX, and a second entry 204 maps a physical register PRB to the architectural register ECX. These mappings may be the result of prior instructions that have since completed, in which the RETIRE locations of entries 202 and 204 store indexes PRA and PRB, respectively, indicating that EBX is mapped to physical register PRA and ECX is mapped to physical register PRB. A third entry 206 and a fourth entry 208 illustrate results of the MOV instructions μop1, μop2 and μop3 described above. In response to μop1, the mapping logic 118 allocates the entry 206 in the rename table 116 and stores the identifier EAX into the ARCH location to identify the architectural register EAX for a 32-bit configuration. For a 64-bit configuration, the identifier may instead be RAX. The mapping logic 118 consults the free list 120, allocates an available physical register accessed using an index PRC, and stores the index PRC in the LARGER location of the entry 206. The mapping logic 118 further detects the size of the write as 32-bits, and stores a size value SZ1 in the LAST WRITE SIZE of entry 206 indicating that the last write size (which is the first write size so far) is 32 bits. The SMALLER and RETIRE locations of the entry 206 are not yet defined. In this manner, the physical register identified by index PRC is speculatively mapped to the architectural register EAX and to the first MOV instruction μop1.

The second MOV instruction μop2 references the architectural register AX, which is the least significant portion of the architectural register EAX. The mapping logic 118 consults the free list 120, allocates an available physical register accessed using an index PRD, and stores the index PRD in the SMALLER location of the entry 206 when the mapping logic 118 detects the write size of the second MOV instruction μop2 (16-bits) is smaller than the first MOV instruction μop1 (32-bits). It is noted that if the mapping logic 118 detects that the write size of the second MOV instruction μop2 (e.g., if the write size of μop2 is 32-bits) is larger than or equal to the first MOV instruction μop1 (32-bits), it stores the index PRD in the LARGER location of the entry 206 to overwrite the index PRC instead. That is, the LARGER location of the entry 206 always records the size of the largest write instruction referencing the same architectural register EAX. The mapping logic 118 further updates the value SZ1 in the LAST WRITE SIZE of entry 206 to a value SZ2 indicating the last write size of the write instruction referencing the architectural register EAX is 16 bits. As shown, SZ1 is replaced by SZ2. The RETIRE location of the entry 206 is still not yet defined. In response to μop3, the mapping logic 118 allocates the entry 208 in the rename table 116 and stores the identifier ESP into the ARCH location to identify the architectural register ESP. The mapping logic 118 consults the free list 120, allocates an available physical register accessed using an index PRE, and stores the index PRE in the LARGER location of the entry 208. The mapping logic 118 further detects the size of the write as 32-bits, and stores a size value SZ3 in the LAST WRITE SIZE of entry 208.

In a similar manner as with the conventional configuration, neither of the first and second physical registers PRC and PRD holds the complete contents of the EAX architectural register. The third and last MOV instruction μop3 cannot fetch the complete contents of EAX from a single physical register. The size tracking logic 122 monitors the rename table 116 if detects the merge condition if the write size of the second MOV instruction μop2 is smaller than the first MOV instruction μop1. The previous, larger write results are to be stored in the physical register PRC whereas the subsequent, smaller write results are to be stored in the physical register PRD. Thus the size tracking logic 122 provides the merge indication MI for the second MOV instruction μop2. The merge indication, when indicated, is stored as the M bit in the corresponding entry of ROB 110 allocated for the second MOV instruction μop2 when μop2 passes through RAT phase.

When the partial write instruction retires, a merge operation is invoked if the M bit of the ROB entry is set. As further described herein, the merge logic 115 detects the M bit set of the ROB entry and merges the partial results of the physical register PRD with the physical register PRC before μop3 is executed. In one embodiment, if μop2 is detected to be a partial write instruction whose write size is smaller than the size of the write instruction corresponding to the LARGER location, then during the write back stage of μop2, the partial result is stored in either the physical register PRD, or the partial write buffer 113 (if provided), or both. In embodiments in which the partial write buffer 113 is provided to release pressure on the requirement of the read ports of the PRF 114, the merge logic 115 reads the result of the partial write instruction of μop2 from the partial write buffer 113 when doing merge instead of reading it from PRD. In other embodiments in which the partial write buffer 113 is not provided, the partial results are only stored into the physical register PRD in the PRF 114 during the write back stage of μop2. In such embodiment, the merge logic 115 reads the result of the partial write instruction μop2 from the physical register PRD in PRF 114 when doing the merge operation. The size of the partial write results to be merged is indicated by the partial write instruction μop2 itself provided in the corresponding entry in ROB 110.

Figure 3:
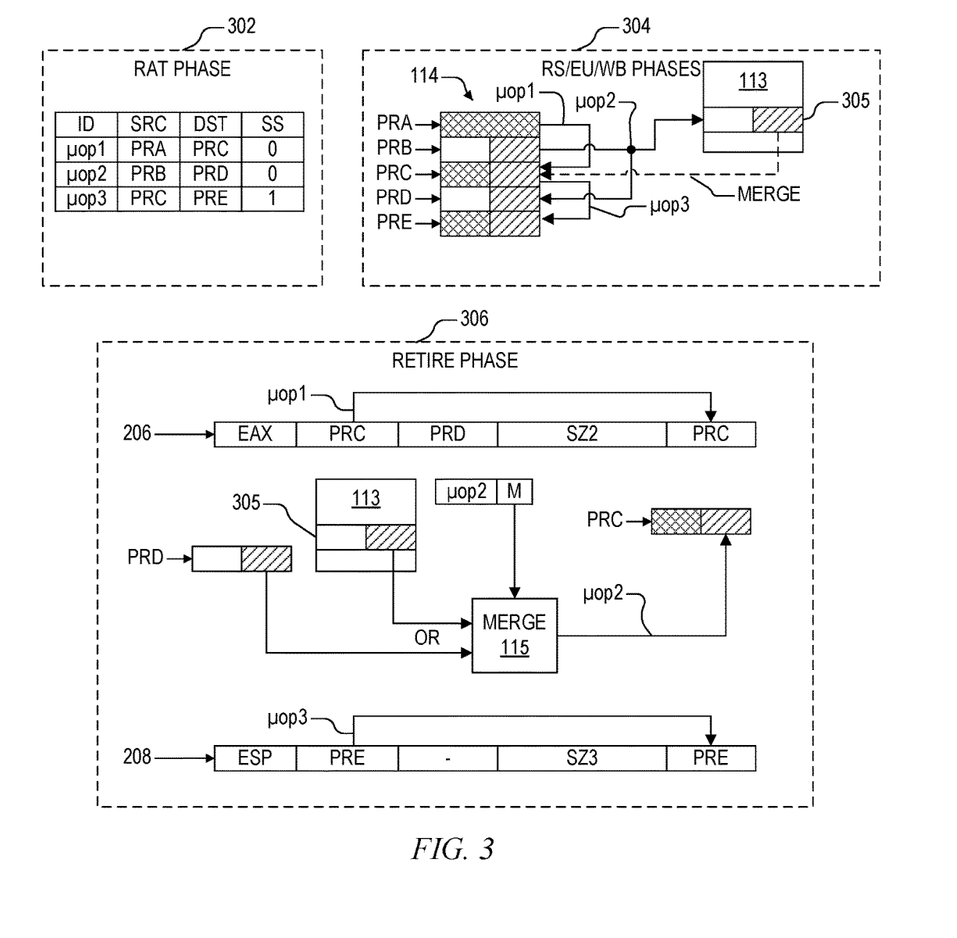
FIG. 3 is a series of diagrams illustrating operation of each of the instructions μop1, μop2 and μop3 during the different processing stages of the processor of FIG. 1 according to one embodiment.

FIG. 3 is a series of diagrams illustrating operation of each of the instructions μop1, μop2 and μop3 during the different processing stages of the processor 100 according to one embodiment. A RAT phase 302 is shown illustrating operation and results performed by the RAT 106. Each instruction includes multiple fields, such as an instruction identifier ID, a source identifier SRC, a destination identifier DST, and a self-serializing field SS. Although not shown, a merge field may be included for storing the merge indication bit M. The size tracking logic 122 detects a sizing issue in which a read instruction reads a value that is not contained within a single physical register but instead is distributed into multiple physical registers, such that the values need to be merged together prior to the read operation. If so, the size tracking logic 122 marks the instruction as self-serializing by asserting the value in the SS field as a logic "1". Additional fields may be included but are not shown. Also, any given instruction may not use all of the fields provides. For example, a store instruction including an immediate value to store in a register or a memory location may include a destination value but not a source value.

As shown in the RAT phase 302, the source of μop1 is the physical register PRA mapped to EBX and the destination is the physical register PRC mapped to EAX. μop1 is not marked as self-serializing so that its SS value is "0". The source of μop2 is the physical register PRB mapped to ECX and the destination is the physical register PRD mapped to EAX. Also, μop2 is not marked as self-serializing so that its SS value is "0". The source of μop3 is the physical register PRC mapped to EAX and the destination is the physical register PRE mapped to ESP. If the size tracking logic 122 detects from the rename table 116 that the size of the source of μop3 (32-bit) is larger than the LAST WRITE SIZE value SZ2 (16-bit), it determines that the read instruction μop3 specifies its source EAX as mapped to the destinations of both μop2 and μop1. That is, two different physical registers PRC and PRD hold values to be read by the instruction μop3 rather than just the physical register PRD of the last write instruction μop2. In that case, the size tracking logic 122 marks μop3 as self-serializing so that its SS value is "1". When μop3 is issued to the RS 108, the RS 108 does not dispatch μop3 for execution before the instructions μop1 and μop2 have been retired. Moreover, the size tracking logic 122 sets μop3 as dependent upon μop1 but not μop2.

An RS/EU/WB phase 304 collectively shows the results of operations in the RS 108, the EU 112 and during WB of each of the instructions μop1-μop3. A portion of the PRF 114 is shown including the physical registers PRA, PRB, PRC, PRD and PRE. During execution of μop1, the contents of the physical register PRA, shown with cross-hatched shading, are moved to the physical register PRC. During execution of μop2, the partial contents of the physical register PRB, shown with hatched line shading, are moved to the physical register PRD. In some embodiments in which the partial write buffer 113 is included, the partial contents are also moved to a location 305 within the partial write buffer 113 in order to facilitate a subsequent merge operation if indicated. In one embodiment, if the partial write buffer 113 is full, the front end of the processor 100 may be temporarily stalled until a storage location is available in the partial write buffer 113. During execution of μop3, the contents of the physical register PRC are moved to the physical register PRE. However, execution of μop3 does not occur when it is detected that its source is larger than the LAST WRITE SIZE value SZ2 until after a merge operation is performed in a RETIRE phase 306. Of course, if the source of μop3 is detected to be not larger than the LAST WRITE SIZE value SZ2, μop3 is set dependent upon the last write instruction, like μop2.

The RETIRE phase 306 illustrates that during retirement of μop1, the ROB 110 changes the architectural mapping of EAX by copying the index PRC for the physical register PRC (with index PRC) to the RETIRE location of the entry 206 within the rename table 116. During retirement of μop2, if the merge logic 115 detects the M bit set in the ROB entry of μop2, the merge logic 115 merges the partial contents of the physical register PRD or the partial contents stored in location 305 of the partial write buffer 113 into the corresponding portion of the physical register PRC. The value stored in the ROB entry of μop2 indicates the size of the partial write to be merged. When μop3 moves the contents of the physical register PRC to the physical register PRE according to its ROB entry, the contents of the physical register PRC have been merged with the partial write of µop2 from the partial write buffer 113 (or from the physical register PRD) so that the physical register PRE stores the correct result. During retirement of µop3, the ROB 110 changes the architectural mapping of ESP by copying the index PRE for the physical register PRE to the RETIRE location of the entry 208 within the rename table 116. In this manner, the architectural register ESP is mapped to the physical register PRE storing the correct results of the instructions µop1-µop3.

In one embodiment, the partial write buffer 113 is indexed by a ROB index provided for each of the entries of the ROB 110. The entries of the partial write buffer 113 are allocated in the RAT phase 302 and takes the ROB index to occupy the entry ahead. During the WB phase, the result is written into the partial write buffer 113 according to the ROB index of the instruction. Furthermore, any additional information that the merge operation needs, like the merged size of µop2, the merged size of µop1, etc., is stored in ROB entries of the retired instructions. The ROB 110 detects that µop2 is retiring, and if the merge logic 115 detects that the M bit of the ROB entry for µop2 is set, then the merge logic 115 conducts the merge operation. It is noted that the size tracking logic 122 sets the M bit in the ROB entry of µop2 if a merge condition is indicated, such as when the write size SZ2 of µop2 is smaller than the larger write size SZ1 of µop1.

In some embodiments as further shown in FIG. 2, the write size of the previous and larger write instruction (e.g., µop1) is stored in a LARGER WRITE SIZE location of the entry 206, whose LARGER location has been written at least once by the previous and larger write instruction (e.g., µop1). The write size of the current write instruction (e.g., µop2) is compared with the LARGER WRITE SIZE, and if the write size of the current write instruction is smaller, then the SMALLER location is updated by the index of the physical register PRD of µop2, and the M bit of ROB entry of the µop2 is set to indicate that µop2 is a partial write instruction and needs a merge operation during the RETIRE phase 306.

Figure 4:
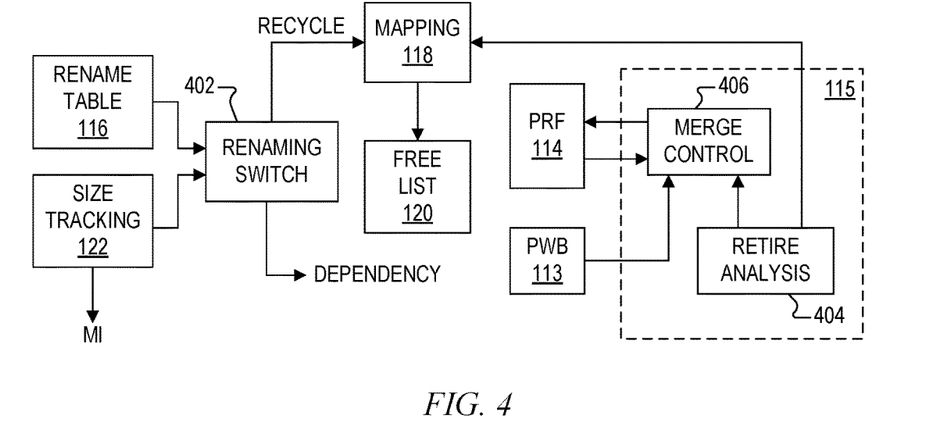
FIG. 4 is a block diagram illustrating operation at the front end, such as within the RAT of FIG. 1 during a RAT phase, and operation at the back end, such as within the ROB of FIG. 1 during a retire phase, for performing size analysis, merge operations, instruction dependency determinations and the state of the physical registers according to one embodiment.

FIG. 4 is a block diagram illustrating operation at the front end, such as within the RAT 106 during the RAT phase 302, and operation at the back end, such as within the ROB 110 during the RETIRE phase 306, for performing size analysis, merge operations, instruction dependency determinations and the state of the physical registers according to one embodiment. As previously described, the size tracking logic 122 monitors changes of the rename table 116 and asserts the MI signal in the ROB entry during the RAT phase 302 to indicate merge operations. Renaming switch logic 402 also tracks the information from the rename table 116 and the size tracking logic 122 to set dependency of the instructions and to instruct said mapping logic 118 to recycle the physical registers back to the free list 120. The merge logic 115 includes retire analysis logic 404 detecting the MI signal (via a merge bit M or the like) and merge control logic 406 for facilitating and controlling merge operations between different physical registers of the PRF 114 and the partial write buffer 113. The retire analysis logic 404 also communicates with the mapping logic 118 to update the rename table 116, such as by updating the architecture register mapping during the RETIRE phase 306.

Figure 5:
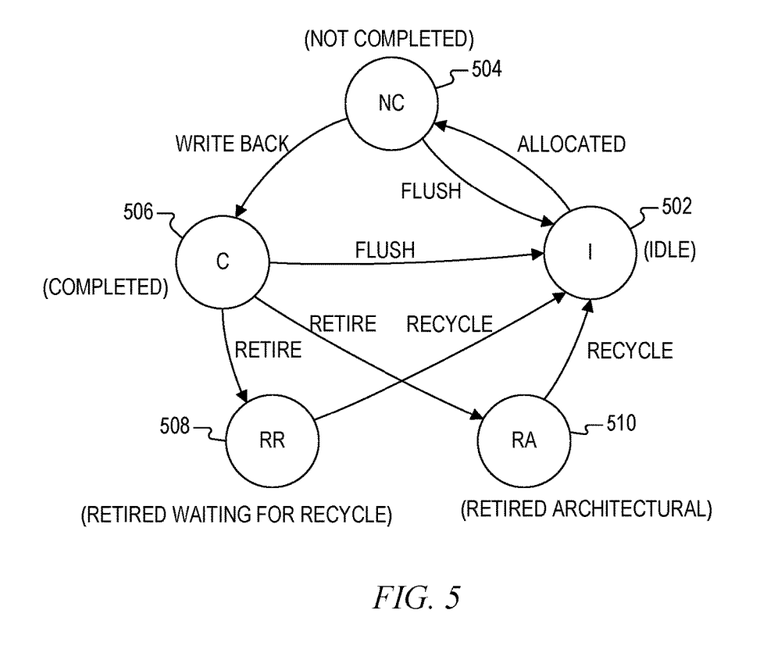
FIG. 5 is a state diagram illustrating the states of each of the physical registers of the physical register file of FIG. 1 as controlled by the renaming switch logic of FIG. 4.

FIG. 5 is a state diagram illustrating the states of each of the physical registers of the PRF 114 as controlled by the renaming switch logic 402. Each physical register has an idle (I) state 502, a not completed (NC) state 504, a completed (C) state, a retired and wait for recycle (RR) state 508, and a retired architectural (RA) state 510. Each physical register identified in the free list 120 is initially in the I state 502. When a physical register is allocated, the state of the register transitions to the NC state 504. After execution of the corresponding write instruction during the write back (WB) phase, the state of the corresponding register transitions to the C state 506. During normal operation, upon retirement of the corresponding instruction, the state of the register transitions to the RA state 510. For example, the physical registers PRA and PRB shown in the rename table 116 mapped to the architectural registers EBX and ECX, respectively, are in the RA state 510. A subsequent instruction that redefines an architectural register to another physical register upon retirement of that subsequent instruction causes the state of the physical register previously mapped to that same architectural register to be recycled or de-allocated back to the I state 502.

The RR state 508 is an additional state for physical registers that hold partial write results that are not retired to the RA state 510 when the corresponding instruction is retired. Essentially, this means that the physical register is not mapped to an architectural register, but instead acts as a temporary register for forwarding results. As an example, the physical register PRD shown in entry 206 of the rename table 116 is not mapped to the architectural register EAX upon retirement of µop2, so that it does not transition to the RA state 510. Instead, the physical register PRD transitions to the RR state 508 upon retirement of µop2. The physical registers in either the RR state 508 or the RA state 510 are recycled in the same manner as in the conventional method when a subsequent write occurs to the same architectural register. For example, a subsequent write to the architectural register EAX (currently mapped to the physical register PRC as shown in the entry 206 of the rename table 116) causes both the physical registers PRC and PRD to be recycled. In the event of a flush of the processor 100, any physical registers in the NC state 504 or the C state 506 are returned to the I state 502.

Figure 6:
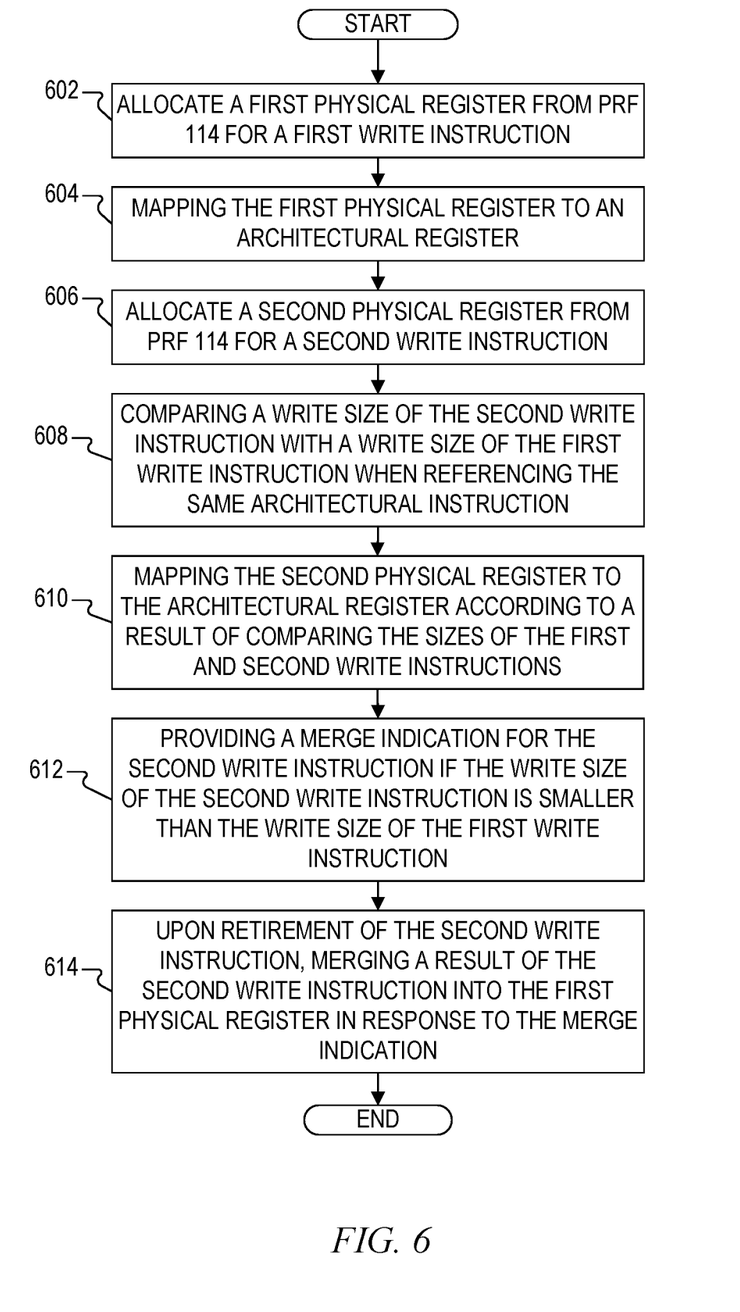
FIG. 6 is a flowchart diagram illustrated a method of merging partial write result during the retire phase of a write instruction according to one embodiment of the present invention.

FIG. 6 is a flowchart diagram illustrated a method of merging a partial write result during the retire phase of a write instruction according to one embodiment of the present invention. At a first step 602, a first physical register is allocated from the PRF 114 for a first write instruction. In the previous example, the mapping logic 118 allocates the physical register PRC for the first write instruction µop1. At next step 604, the first physical register is mapped to an architectural register. The instruction, such as µop1, specifies an architectural register, such as EAX, and the mapping between PRC and EAX is stored in the rename table 116. Assuming a mapping for EAX did not previously exist, a new entry (e.g., entry 206) is made in the rename table 116 and the index PRC is written into the LARGER location for the entry. The LARGER location is used to write the index of the physical register for the first write instruction and any subsequent write instructions that are the same size or larger.

At next step 606, a second physical register is allocated from the PRF 114 for a second write instruction. Continuing the example above, the mapping logic 118 allocates the physical register PRD for the second write instruction µop2. Assuming the second write instruction references the same architectural register (e.g., EAX, or a subset or superset thereof), then at next step 608, the write size of the second write instruction is compared with the write size of the first write instruction. At next step 610, the second physical register is mapped to the architectural register according to a result of comparing the sizes of the first and second instructions. If the size of the second write instruction is the same size or larger than the size of the first write instruction, then index in the entry for the first write instruction is overwritten by the index for the second write instruction. If the size of the second write instruction is smaller than the size of the first write instruction, however, then the index for the second write instruction is written into the SMALLER location of the same entry for the same architectural register. As shown in the rename table 116, for example, the index PRD for the second write instruction μop2 is stored in the SMALLER location of the entry 206 for EAX.

As stated in next step 612, a merge indication is provided for the second write instruction if the size of the second write instruction is smaller than the size of the first write instruction. As shown in FIG. 1, a merge indication signal MI is asserted when this condition is met. In one embodiment as shown, the MI signal is used to set a merge bit M in an entry of the ROB 110 for the second write instruction μop2. At last step 614, upon retirement of the second write instruction, the result of the second write instruction is merged with first physical register in response to the merge indication. As shown in FIG. 3 during the RETIRE phase 306 of the second write instruction μop2, for example, the partial result stored in the physical register PRD for the second write instruction μop2 is merged by the merge logic 115 with the physical register PRC assigned to the first write instruction μop1. Alternatively, the partial result of the second write instruction μop2 is stored in the partial write buffer 113, if provided, so that the partial result is instead retrieved from the partial write buffer 113.

The method may include additional steps, such as marking a subsequent read instruction (e.g., μop3) as self-serializing and making the read instruction dependent upon the first write instruction when the read instruction specifies the same architectural as a source. The method may include transitioning the first physical register to a retired non-architectural state upon retirement of the second write instruction, and transitioning the second physical register to a retired architectural state upon retirement of the first write instruction. The method may include recycling the first and second physical registers when a subsequent instruction remaps the architectural register in the rename table. The method may include storing the result of the second write instruction into a partial write buffer during write back of the second write instruction if the write size of the second write instruction is smaller than the write size of the first write instruction, and reading the result of the second write instruction from the partial write buffer during the merge operation. The method may include storing the write size of the first write instruction, and comparing the write size of the second write instruction with the stored write size of the first write instruction. The method may include storing the merge indication as a merge bit in an entry of a reorder buffer (e.g., ROB 110) for the second write instruction.

The foregoing description has been presented to enable one of ordinary skill in the art to make and use the present invention as provided within the context of a particular application and its requirements. Although the present invention has been described in considerable detail with reference to certain preferred versions thereof, other versions and variations are possible and contemplated. Various modifications to the preferred embodiments will be apparent to one skilled in the art, and the general principles defined herein may be applied to other embodiments. For example, the blocks described herein may be implemented in any suitable manner including logic devices or circuitry or the like. Those skilled in the art should appreciate that they can readily use the disclosed conception and specific embodiments as a basis for designing or modifying other structures for carrying out the same purposes of the present invention without departing from the spirit and scope of the invention. Therefore, the present invention is not intended to be limited to the particular embodiments shown and described herein, but is to be accorded the widest scope consistent with the principles and novel features herein disclosed.

What is claimed is:

1. A processor, comprising:
a physical register file comprising a plurality of physical registers each identified by a corresponding one of a plurality of physical register indexes;
a rename table with a plurality of entries, each of said plurality of entries storing an architectural identifier identifying one of a plurality of architectural registers, a larger physical register index and a smaller physical register index;
mapping logic that detects a partial write instruction specifying an architectural register already identified by an existing entry within said rename table for a previous write instruction having a write size that is larger than said partial write instruction, wherein said mapping logic allocates a first physical register and updates said smaller physical register index of said existing entry with a first physical register index of said first physical register;
size tracking logic that sets a merge indication for said partial write instruction if said write size of said previous write instruction is larger than said partial write instruction; and
merge logic that merges a result of said partial write instruction with a second physical register during retirement of said partial write instruction in response to said merge indication, wherein said second physical register is identified by said larger physical register index of said existing entry.

2. The processor of claim 1, wherein said size tracking logic accesses a last write size location of said existing entry to determine whether a read instruction specifies a source as said architectural register mapped to both said previous and partial write instructions, wherein said last write size location stores a write size of a last write instruction, and wherein said last write instruction is a later one of said previous write instruction and said partial write instruction.

3. The processor of claim 2, wherein if a size of said source of said read instruction is larger than said write size of said last write instruction, said size tracking logic determines whether said read instruction specifies said source as said architectural register mapped to both said previous and partial write instructions.

4. The processor of claim 1, wherein if said size tracking logic determines that a read instruction specifies a source as said architectural register mapped to both said previous and partial write instructions, said size tracking logic marks said read instruction as self-serializing and sets said read instruction as dependent upon said previous write instruction.

5. The processor of claim 1, further comprising renaming switch logic that transitions said first physical register to a retired non-architectural state upon retirement of said partial write instruction and that transitions said second physical register to a retired architectural state upon retirement of said previous write instruction.

6. The processor of claim 5, wherein said renaming switch logic recycles said first and second physical registers when a subsequent instruction remaps said architectural register identified in said existing entry of said rename table.

7. The processor of claim 1, further comprising a partial write buffer that stores said result of said partial write instruction during write back of said partial write instruction, and wherein said merge logic reads said result of said partial write instruction from said partial write buffer.

8. The processor of claim 1, wherein said write size of said previous write instruction is stored in a larger write size location of said existing entry, and wherein said mapping logic accesses said larger write size location to determine whether to update said smaller physical register index of said existing entry.

9. The processor of claim 1, wherein said write size of said previous write instruction is stored in a larger write size location of said existing entry, and wherein said size tracking logic accesses said larger write size location to determine whether to provide said merge indication.

10. The processor of claim 1, wherein said merge indication is stored as a merge bit in an entry of a reorder buffer for said partial write instruction.

11. A method of merging partial write results to resolve size issues in a processor, comprising:
   allocating a first physical register from a register file for a first write instruction and mapping the first physical register to an architectural register;
   allocating a second physical register from the register file for a second write instruction that references the architectural register;
   comparing a write size of the second write instruction with a write size of the first write instruction;
   mapping the second physical register to the architectural register according to a result of said comparing;
   providing a merge indication for the second write instruction if the write size of the second write instruction is smaller than the write size the first write instruction; and
   upon retirement of the second write instruction, merging a result of the second write instruction into the first physical register in response to the merge indication.

12. The method of claim 11, wherein said mapping the first physical register to an architectural register comprises storing a first index in a larger location of an entry of a rename table for the architectural register.

13. The method of claim 12, wherein said mapping the second physical register to the architectural register according to the result of said comparing comprises storing a second index in a smaller location of the entry if the write size of the second write instruction is smaller than the write size of the first write instruction, and storing the second index in the larger location of the entry if the write size of the second write instruction is not smaller than the write size of the first write instruction.

14. The method of claim 11, wherein said merging the result of the second write instruction into the first physical register comprises reading a size value of the second write instruction stored in an entry of a rename table mapped to the second write instruction.

15. The method of claim 11, further comprising marking a read instruction as self-serializing and making the read instruction dependent upon the first write instruction when the read instruction specifies the architectural register mapped to both the first write instruction and the second write instruction as a source.

16. The method of claim 11, further comprising:
   transitioning the first physical register to a retired non-architectural state upon retirement of the second write instruction; and
   transitioning the second physical register to a retired architectural state upon retirement of the first write instruction.

17. The method of claim 16, further comprising recycling the first and second physical registers when a subsequent instruction remaps the architectural register.

18. The method of claim 11, further comprising storing the result of the second write instruction into a partial write buffer during write back of the second write instruction if the write size of the second write instruction is smaller than the write size of the first write instruction, and reading the result of the second write instruction from the partial write buffer during said merging.

19. The method of claim 11, further comprising storing the write size of the first write instruction, and comparing the write size of the second write instruction with the stored write size of the first write instruction.

20. The method of claim 11, further comprising storing the merge indication as a merge bit in an entry of a reorder buffer for the second write instruction.

* * * * *